US008918864B2

(12) United States Patent
Balasubramanian

(10) Patent No.: US 8,918,864 B2
(45) Date of Patent: Dec. 23, 2014

(54) SYSTEM, METHOD, AND COMPUTER PROGRAM PRODUCT FOR MAKING A SCAN DECISION DURING COMMUNICATION OF DATA OVER A NETWORK

(75) Inventor: Harish Balasubramanian, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 848 days.

(21) Appl. No.: 11/758,494

(22) Filed: Jun. 5, 2007

(65) Prior Publication Data
US 2013/0247178 A1    Sep. 19, 2013

(51) Int. Cl.
*H04L 29/06* (2006.01)

(52) U.S. Cl.
USPC .................................. 726/22; 713/188

(58) Field of Classification Search
USPC ................. 726/22, 23, 24, 25; 713/188, 176
See application file for complete search history.

(56) References Cited

U.S. PATENT DOCUMENTS

| | | | |
|---|---|---|---|
| 5,987,610 A | 11/1999 | Franczek et al. | |
| 6,035,423 A * | 3/2000 | Hodges et al. | 726/24 |
| 6,073,142 A | 6/2000 | Geiger et al. | |
| 6,088,803 A | 7/2000 | Tso et al. | |
| 6,094,731 A | 7/2000 | Waldin et al. | 714/38 |
| 6,233,618 B1 | 5/2001 | Shannon | |
| 6,460,050 B1 | 10/2002 | Pace et al. | |
| 6,654,751 B1 | 11/2003 | Schmugar et al. | |
| 6,785,732 B1 | 8/2004 | Bates et al. | |
| 6,789,201 B2 | 9/2004 | Barton et al. | |
| 6,802,012 B1 | 10/2004 | Smithson et al. | |
| 7,107,618 B1 | 9/2006 | Gordon et al. | 726/24 |
| 7,506,155 B1 | 3/2009 | Stewart et al. | |
| 7,873,996 B1 * | 1/2011 | Emigh et al. | 726/22 |
| 8,196,206 B1 | 6/2012 | Gartside et al. | |
| 8,601,067 B2 | 12/2013 | Gartside et al. | |
| 8,856,931 B2 | 10/2014 | Gartside et al. | |
| 2002/0178381 A1 | 11/2002 | Lee et al. | |
| 2003/0023708 A1 | 1/2003 | Jung | |
| 2003/0097591 A1 | 5/2003 | Pham et al. | |
| 2003/0221129 A1 | 11/2003 | Hejl | |
| 2004/0064737 A1 * | 4/2004 | Milliken et al. | 726/23 |
| 2004/0111480 A1 * | 6/2004 | Yue | 709/206 |
| 2004/0117648 A1 * | 6/2004 | Kissel | 713/200 |
| 2004/0221014 A1 * | 11/2004 | Tomkow | 713/176 |
| 2005/0015626 A1 | 1/2005 | Chasin | |
| 2005/0131900 A1 * | 6/2005 | Palliyll et al. | 707/10 |
| 2005/0251500 A1 | 11/2005 | Vahalia et al. | |
| 2006/0047634 A1 | 3/2006 | Aaron et al. | |
| 2006/0074809 A1 | 4/2006 | Meyer | |
| 2006/0185017 A1 * | 8/2006 | Challener et al. | 726/24 |
| 2006/0248573 A1 | 11/2006 | Pannu et al. | |
| 2006/0253582 A1 | 11/2006 | Dixon et al. | |

(Continued)

OTHER PUBLICATIONS

U.S. Appl. No. 11/742,423, filed Apr. 30, 2007.

(Continued)

*Primary Examiner* — Jeffrey Pwu
*Assistant Examiner* — Thong Truong
(74) *Attorney, Agent, or Firm* — Patent Capital Group

(57) ABSTRACT

A system, method, and computer program product are provided for scanning data during communication of the data over a network. In use, a process is initiated for determining whether to scan data, during communication of the data over the network. Further, the data is conditionally scanned based on the determination.

19 Claims, 8 Drawing Sheets

(56) References Cited

U.S. PATENT DOCUMENTS

| | | |
|---|---|---|
| 2007/0011739 A1 | 1/2007 | Zamir et al. |
| 2007/0100999 A1 | 5/2007 | Haider |
| 2008/0208868 A1 | 8/2008 | Hubbard |
| 2012/0151521 A1 | 6/2012 | Gilley et al. |
| 2012/0227110 A1 | 9/2012 | Gartside et al. |

OTHER PUBLICATIONS

Response to Non-Final Office Action dated May 12, 2009 in U.S. Appl. No. 11/742,423, filed Oct. 12, 2009.
Response to Non-Final Office Action dated Jan. 21, 2010 in U.S. Appl. No. 11/742,423, filed Apr. 21, 2010.
Request for Continued Examination and Amendment in U.S. Appl. No. 11/742,423, filed Jan. 10, 2011.
Non-Final Office Action in U.S. Appl. No. 11/742,423 mailed on Sep. 8, 2011.
Response to Non-Final Office Action dated Mar. 22, 2010 in U.S. Appl. No. 11/742,455, filed Jun. 22, 2010.
Request for Continued Examination and Amendment in U.S. Appl. No. 11/742,455 mailed on Feb. 23, 2011.
Response to Non-Final Office Action dated Sep. 8, 2011 in U.S. Appl. No. 11/742,423, filed Dec. 8, 2011.
"NoScript—Whitelist Javascript blocking for a safer Firefox experience!—features—InformAction", 3 pages, archive from May 26, 2005.
"NoScript—Whitelist JavaScript blocking for a safer Firefox experience!—what is it?—InformAction," 2 pages, Archive from May 26, 2005.
"NoScript—Whitelist JavaScript blocking for a safer Firefox experience!—screenshots—InformAction," 3 pages, ARchive from May 26, 2005.
"NoScript—Whitelist JavaScript blocking for a safer Firefox experience!—faq—InformAction," 6 pages, Archive from May 26, 2005.
"NoScript—Whitelist JavaScript blocking for a safer Firefox experience!—what is it?—InformAction," 3 pages, Archive from Apr. 9, 2006.
Berezovska, L., "Stephen Hawking: Time Travel Possible, But Only Forward," The Epoch Times, Jul. 7, 2010, 3 pages.
Final Office Action Summary from U.S. Appl. No. 11/742,423 mailed on Jul. 8, 2010.
Office Action Summary from U.S. Appl. No. 11/742,423 mailed on May 12, 2009.
Office Action Summary from U.S. Appl. No. 11/742,423 mailed on Jan. 21, 2010.
U.S. Office Action Summary for U.S. Appl. No. 11/742,455 mailed on Mar. 22, 2010.
Final Office Action from U.S. Appl. No. 11/742,455 dated Sep. 13, 2010.
http://webarchive.org/web/*/http://noscript.net/features, 2 pages, printed Mar. 10, 2010.
U.S. Appl. No. 11/742,455, filed Apr. 30, 2007.
Final Office Action in U.S. Appl. No. 11/742,423 mailed on Jan. 30, 2012.
Non-Final Office Action in U.S. Appl. No. 11/742,455 mailed on Jan. 12, 2011.
Advisory Action dated Jun. 26, 2013 in U.S. Appl. No. 11/742,423.
Request for Continued Examination and Amendment in U.S. Appl. No. 11/742,423, filed Jul. 5, 2013.
Non-Final Office Action in U.S. Appl. No. 13/469,003 mailed on May 7, 2013.
Response to Non-Final Office Action dated May 7, 2013 in U.S. Appl. No. 13/469,003, filed Aug. 7, 2013.
Non-Final Office Action in U.S. Appl. No. 11/742,423 mailed on Oct. 12, 2012.
Request for Continued Examination and Amendment in U.S. Appl. No. 11/742,423, filed Apr. 4, 2012.
Non-Final Office Action in U.S. Appl. No. 11/742,455 mailed on Jan. 12, 2012.
Response to Non-Final Office Action dated Jan. 12, 2012 in U.S. Appl. No. 11/742,455, filed Apr. 12, 2012.
Notice of Allowance in U.S. Appl. No. 11/742,455 mailed on Apr. 27, 2012.
U.S. Appl. No. 13/469,003, filed May 10, 2012, entitled "Network Browser System, Method, and Computer Program Product for Scanning Data for Unwanted Content and Associated Unwanted Sites", Inventors, Paul Nicholas Gartside, et al.
Response to Non-Final Office Action dated Oct. 12, 2012 in U.S. Appl. No. 11/742,423, filed Jan. 14, 2013.
Final Office Action in U.S. Appl. No. 11/742,423 mailed on Apr. 4, 2013.
Response to Final Office Action dated Apr. 4, 2013 in U.S. Appl. No. 11/742,423, filed Jun. 4, 2013.
Notice of Allowance in U.S. Appl. No. 11/742,423 mailed on Aug. 13, 2013.
Final Office Action in U.S. Appl. No. 13/469,003 mailed on Sep. 11, 2013.
Notice of Allowance in U.S. Appl. No. 13/469,003 mailed Apr. 8, 2014.

* cited by examiner

SYSTEM, METHOD, AND COMPUTER PROGRAM PRODUCT FOR MAKING A SCAN DECISION DURING COMMUNICATION OF DATA OVER A NETWORK

FIELD OF THE INVENTION

The present invention relates to network security, and more particularly to scanning data on a network.

BACKGROUND

Traditionally, network security has been provided via various security systems. In particular, such systems have included data scanners which scan data sent and/or received over a network. Oftentimes, network data scanners are located at network gateways, such that data passing through such gateways is scanned for unwanted content. However, scanning data at such gateways has generally been associated with various limitations, such as, for example, delays in throughput of the data, etc.

There is thus a need for addressing these and/or other issues associated with the prior art.

SUMMARY

A system, method, and computer program product are provided for scanning data during communication of the data over a network. In use, a process is initiated for determining whether to scan data, during communication of the data over the network. Further, the data is conditionally scanned based on the determination.

DETAILED DESCRIPTION

Figure 1:
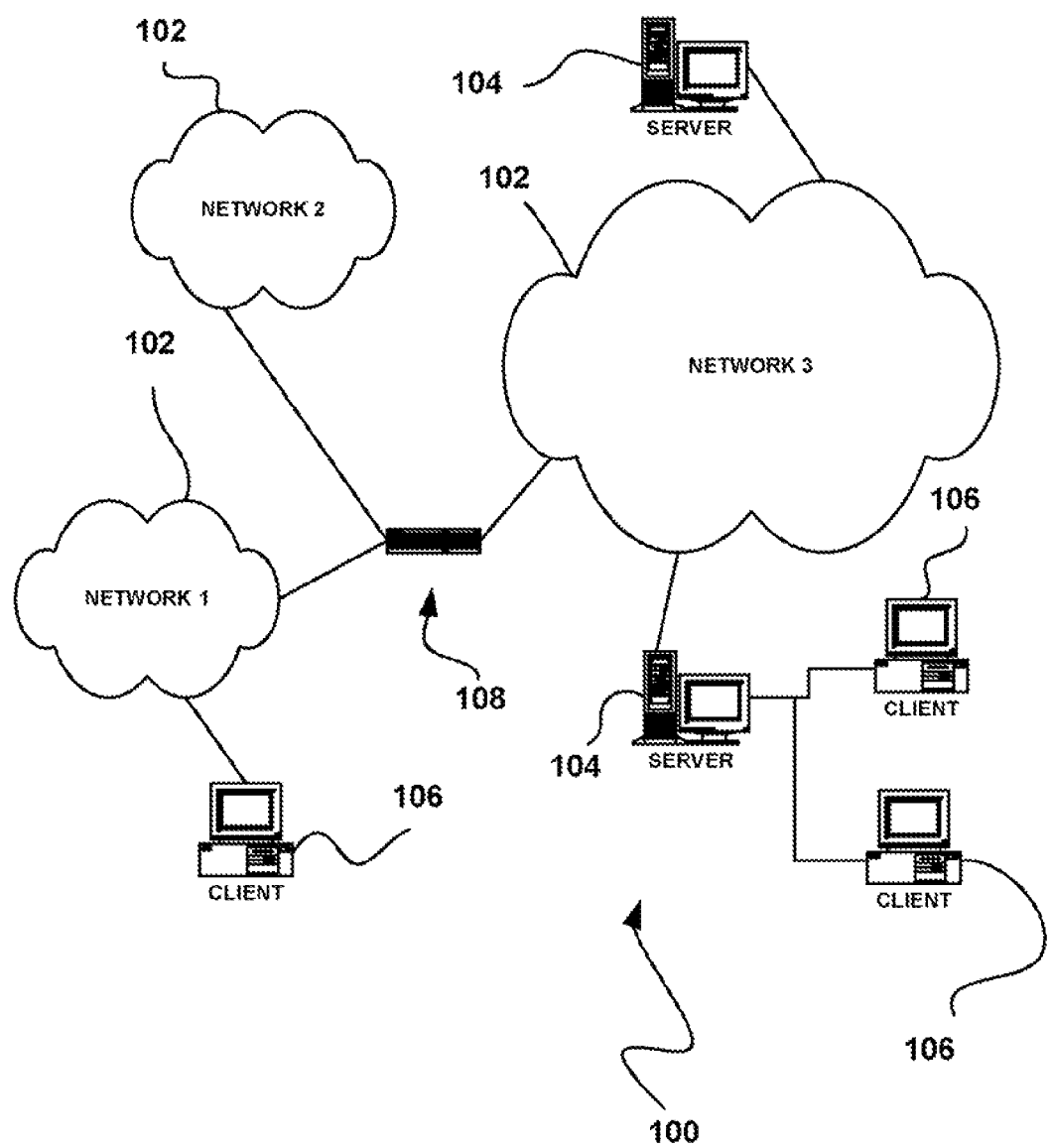
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
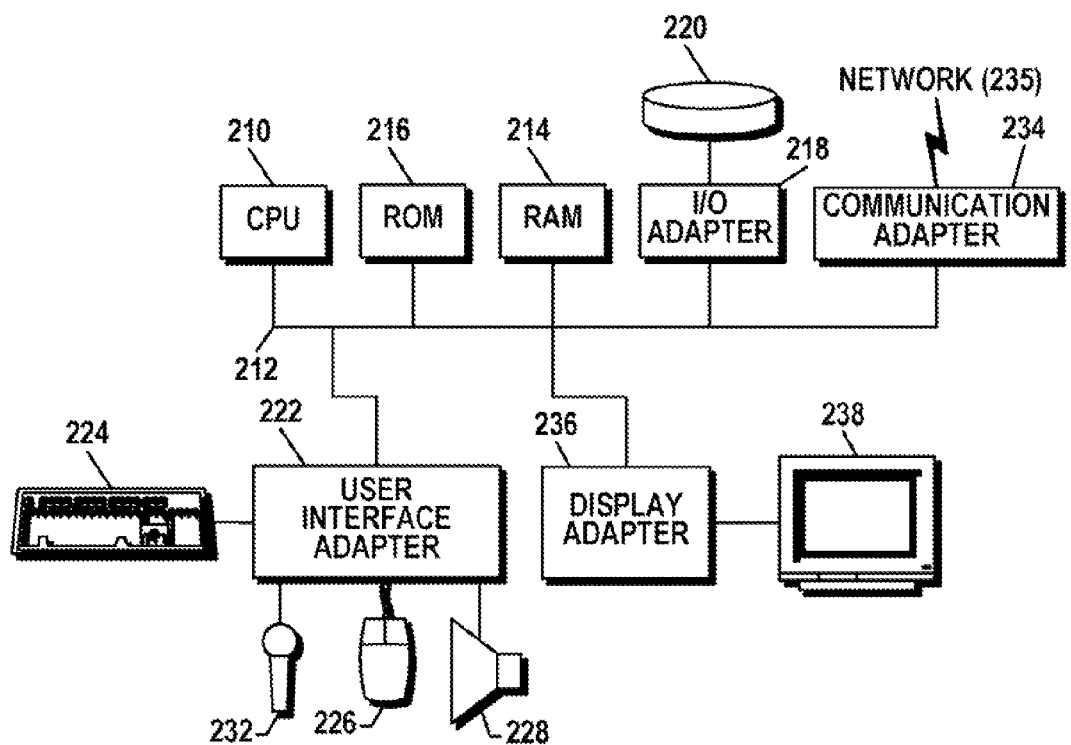
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
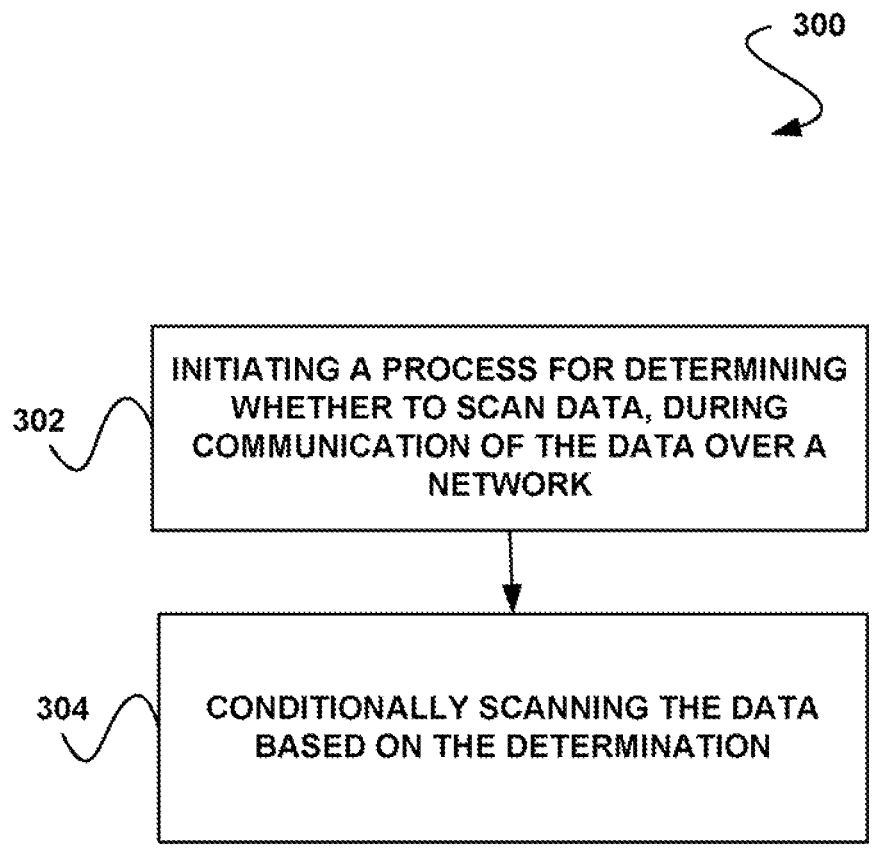
FIG. 3 shows a method for scanning data based on a determination process initiated during communication of the data over a network, in accordance with one embodiment.

FIG. 3 shows a method 300 for scanning data based on a determination process initiated during communication of the data over a network, in accordance with one embodiment. As an option, the method 300 may be carried out in the context of the architecture and environment of FIGS. 1 and/or 2. Of course, however, the method 300 may be carried out in any desired environment.

As shown, a process for determining whether to scan data is initiated during communication of the data over a network. Note operation 302. In the context of the present description, the data may include any information capable of being communicated over a network. For example, in various embodiments, the data may include, but is not limited to one or more files (e.g. data files, media files, software files, etc.), folders, databases, messages, etc. As another option, the data may include attachments to messages sent over the network. For instance, the data may include an attachment to an electronic mail (email) message.

Further, the network may include any network over which the data is capable of being communicated. For example, the network may include any of the networks described above with respect to FIG. 1, etc. Additionally, communicating the data over the network may include communicating the data to one or more devices located on the network from a different device located on the network. For example, in one embodiment, communicating the data over the network may include downloading the data over the network (e.g. utilizing a device capable of downloading such data over the network, etc.). Examples of the devices which may be utilized for sending and/or receiving the data over the network may include any of the clients or servers described above with respect to FIGS. 1 and/or 2.

Furthermore, the data may be communicated utilizing any protocol by which data may be communicated over the network. Examples of various communication protocols that may be utilized include, but are not limited to File Transfer Protocol (FTP), Simple Mail Transfer Protocol (SMTP), etc.

Additionally, the process for determining whether to scan the data may include any process that may be initiated, on which a decision to scan may be based (at least in part). In one embodiment, the process may include performing a comparison of a hash associated with the data with a plurality of hashes stored in at least one database. Just by way of example, the database(s) may store hashes of data known to be malware, clean, etc. In the context of the present description, such hash may include a signature, a number, a message digest, and/or any other at least partially unique identifier.

Accordingly, it may be determined that the data is to be scanned if the process determines that a hash of the data does not match a hash stored in a database of hashes. Just by way of example, such determination may indicate that a status (e.g. clean, malware, etc.) of the data is unknown. In one embodiment, the unknown status may be based on a lack of a previous scan of the data, etc.

Furthermore, the process may be initiated in any desired manner. In one embodiment, the process may be initiated automatically. For example, the process may be initiated in response to communication of the data over the network. In another embodiment, the process may be initiated manually.

Moreover, as shown in operation 304, the data is conditionally scanned based on the determination. In the context of the present description, the scanning may include any analysis of the data for any purpose. In one embodiment, scanning the data may include scanning the data for unwanted content. For example, the unwanted content may include malware, spyware, adware, pornography, sensitive (e.g. confidential) data, etc. To this end, in one embodiment, the data may be scanned in order to determine whether the data is infected with malware, as an option. As another example, the data may be scanned in order to determine if it is of a file type which is predetermined to be banned.

Further, any device capable of scanning the data may conditionally scan the data based on the determination. In one embodiment, a network gateway scanner may perform the scanning. Of course, other embodiments are contemplated where the scanning takes place on a client and/or server.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
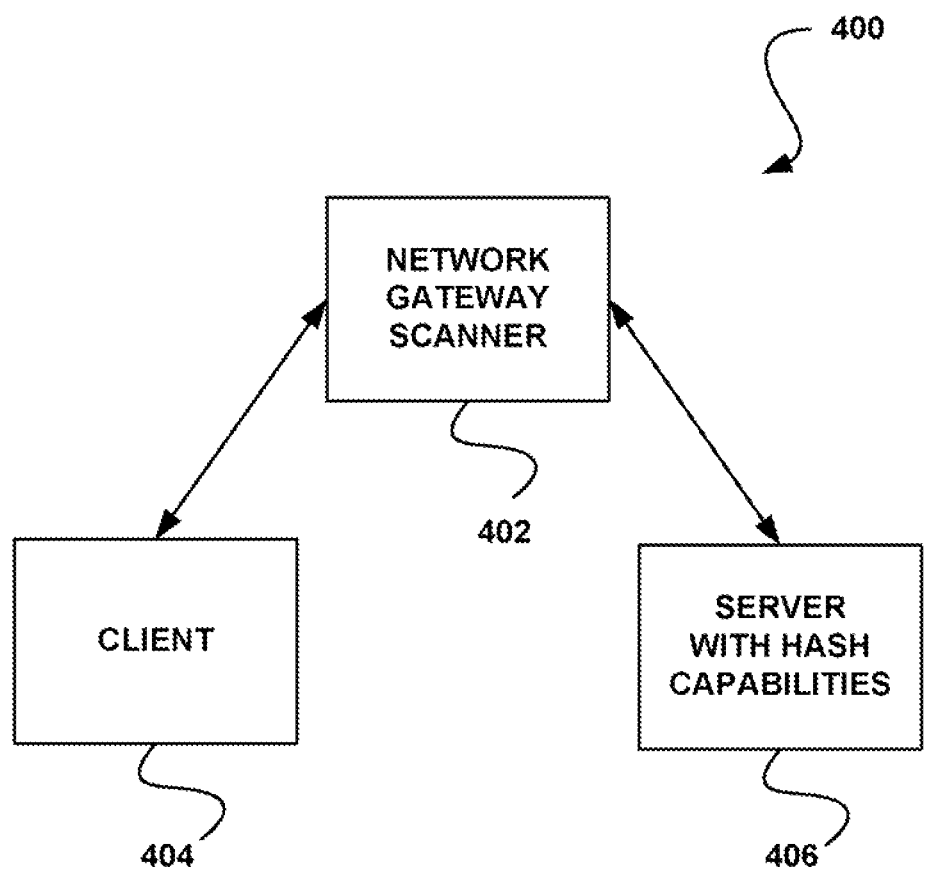
FIG. 4 shows a system for scanning data based on a determination process initiated during communication of the data over a network, in accordance with another embodiment.

FIG. 4 shows a system 400 for scanning data based on a determination process initiated during communication of the data over a network, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

The system 400 shown in FIG. 4 includes a network gateway scanner 402. For example, the network gateway scanner 402 may include any device to which data is communicated over a network (e.g. such as any of the clients or servers described above with respect to FIGS. 1 and/or 2). As shown, the network gateway scanner 402 is coupled between a client 404, and a server 406 with hash capabilities. Thus, the network gateway scanner 402 may receive (e.g. intercept, etc.) data communicated over the network between such client 404 and such server 406. Of course, it should be noted that while a single client 404 and a single server 406 are shown, the network gateway scanner 402 may receive data communicated between any number of different clients and/or servers located on the network.

Additionally, the network gateway scanner 402 may also perform actions based on the received data. Such actions may include initiating a process for determining whether to scan the data, conditionally scanning the data based on the determination, etc. To this end, in various embodiments, the network gateway scanner 402 may include, but is not limited to, a virus scanner, a vulnerability exploitation scanner, a network traffic scanner, and/or any other type of scanner, for that matter.

Accordingly, the network gateway scanner 402 is in communication with the client 404. In the context of the present description, the client 404 may include any device capable of being in communication with the network gateway scanner 402. For example, in various embodiments, the client 404 may include any of the clients or servers described above with respect to FIGS. 1 and/or 2.

In addition, as also shown, the network gateway scanner 402 is in communication with the server 406 with hash capabilities. In the context of the present embodiment, the server 406 may include any device capable of communicating data over the network. In addition, the server 406 may also be capable of receiving requests for data, and optionally data itself, over the network. For example, in various embodiments, the server 406 may include any of the servers (or clients acting as a server) described above with respect to FIGS. 1 and/or 2.

Additionally, the hash capabilities of the server 406 may refer to any ability to generate a hash based, at least in part, on various data. In various embodiments, the hash capabilities may involve hash functions such as a Secure Hash Algorithm (SHA), for example, SHA-1, SHA-2; a Message-Digest algorithm 5 (MD5), etc. In this way, the server 406 may be capable of producing a hash of data which is capable of serving.

Additionally, hashes produced by the hash capabilities for a plurality of different data may be stored in any way by the server 406. For example, each hash may be stored in the header portion of the data from which such hash was computed, but of course may otherwise also be linked to such data as desired (e.g. via a pointer, etc.). In another exemplary embodiment, the hashes may be stored in a hash database located on the server 406.

To this end, in one embodiment, the server 406 may receive a request from the client 404 for data stored at the server 406 via the network gateway scanner 402. In another embodiment, the server 406 may send the requested data to the client 404 via the network gateway scanner 402. In addition, the server 406 may send a hash of such data to the network gateway scanner 402. Such hash may be manually requested by the network gateway scanner 402 and/or automatically provided, in varying embodiments. Further, the hash may or may not accompany the data itself.

Furthermore, the network gateway scanner 402 may initiate a process for determining whether to scan the data during the communication thereof from the server 406 to the network gateway scanner 402/client 404 over the network. Optionally, such determination may be based on the hash of the data received from the server 406 at the network gateway scanner 402.

In addition, the network gateway scanner 402 may conditionally scan the data based on the determination. For example, the network gateway scanner 402 may scan the data if it determines that the hash of the data does not match a hash stored in a database of hashes. Optionally, such database of hashes may be located on the network gateway scanner 402, but of course may also be located remotely as well. Still yet, the network gateway scanner 402 may further perform an action based on the scan (e.g. communicate the data to the client 404, prevent the data from being communicated to the client 404, etc.).

Thus, delays in throughput of data communicated from the server 406 to the client 404 via the network gateway scanner 402 may be limited by initiating the process for determining whether to scan the data during communication of such data over the network. Accordingly, initiation of such process after communication of the data is complete and/or before communication of the data is commenced (e.g. by way of the data request, etc.) may be avoided for increasing throughput of data communicated over the network via the network gateway scanner 402. To this end, in various embodiments, the process may be initiated and/or carried out, at least in part, in parallel or simultaneously with the data communication, thereby not necessarily delaying such data communication, while further not necessarily waiting until the data communication is complete.

Figure 5A:
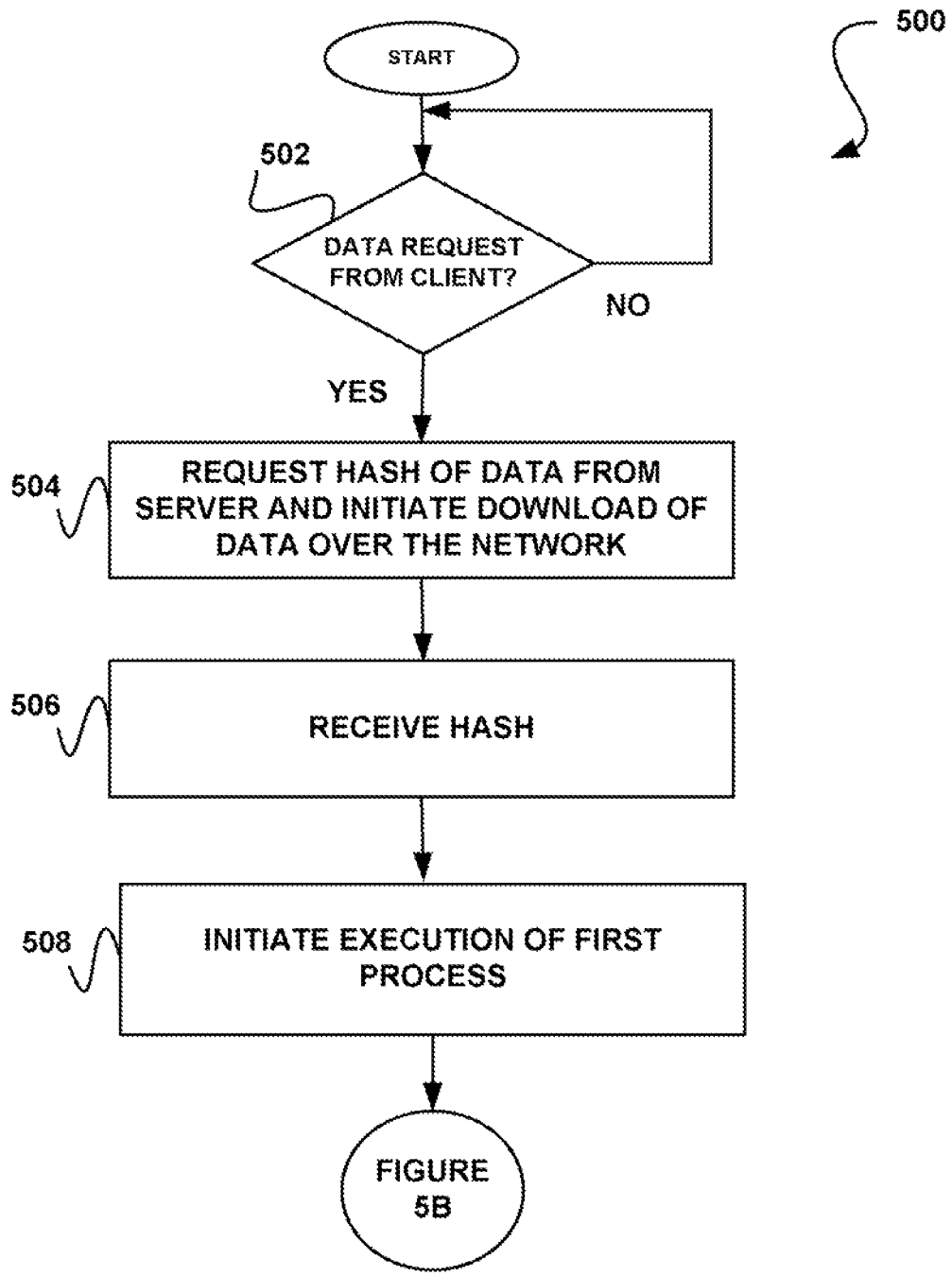
FIG. 5A shows a method for initiating execution of a first process when downloading data over a network, in accordance with yet another embodiment.

FIG. 5A shows a method 500 for initiating execution of a first process during downloading of data over a network, in accordance with yet another embodiment. As an option, the method 500 may be carried out in the context of the architecture and environment of FIGS. 1-4. Of course, however, the method 500 may be carried out in any desired environment. It should also be noted that the aforementioned definitions may apply during the present description.

As shown in decision 502, it is determined whether a data request has been communicated by a client. In the context of the present embodiment, the data request may include any request for data directed to another device on a network. For example, it may be determined whether a client has sent a message to a server requesting data (e.g. a file, etc.) from the server. In one embodiment, the determination may be made by a network gateway scanner (e.g. such as the network gateway scanner 402 of FIG. 4) via which the request is communicated over the network.

Additionally, once it is determined in decision 502 that the client has communicated a data request, a hash of the data is requested from the server and the download of the data is initiated over the network. See operation 504. Downloading the data may include downloading files using FTP, downloading files (e.g. email messages with attachments) utilizing SMTP, etc.

In one embodiment, a hash of the data may be requested by the network gateway scanner. Further, the server may store a database of hashes for a plurality of different data. Thus, the hash of the data may be requested to be retrieved from the database of hashes. Optionally, the hash request may include an identifier of the data (e.g. unique identifier, etc.) for which the hash is requested, such that the server may identify the hash utilizing the identifier of the data. Additionally, the hash may be requested from a server utilizing a certain protocol through the use of a request mechanism supported by that protocol.

Of course, it should be noted that while, in the context of the present description, the hash is requested, the hash may also be automatically communicated over the network. In one embodiment, the hash of the data may be communicated in conjunction with the downloading of such data. For example, the hash may be included in a header of the data associated therewith. Thus, a header associated with the data may be utilized for communicating the hash.

In one exemplary embodiment, the data downloaded over the network may include one or more attachments (e.g. email attachments), where various headers are associated with each of the attachments. Additionally, one such header associated with each of the attachments may include a hash of the attachment (e.g. a hash of the contents included in the attachment). In this way, the hash of the data may be automatically communicated by the server via the downloading of the data over the network. Of course, in another embodiment, the hash of the data may be automatically communicated from the server separate from the downloading of the data, but in response to a data request.

Further, the hash is received, as shown in operation 506. To this end, the hash may be received by the network gateway scanner from the server during downloading of the data over the network, in response to the request for such hash communicated to the server. It should be noted that, in the context of an embodiment with a hash that is automatically received utilizing a header of the data, headers of such data may optionally be parsed in order to obtain the hash located therein.

As further shown in operation 508, execution of a first process is initiated. In the context of the present description, the first process may include any process for determining whether to scan the data during the download. In one embodiment, the first process may utilize the received hash of the data for making such determination. For example, the first process may compare the received hash to at least one database associated with known data (e.g. known malware data, known clean data, etc.) in order to identify hashes therein matching the received hash.

Optionally, the download of the data initiated in operation 504 may be completed before the execution of the first process has been completed. Of course, as another option, execution of the first process may be completed prior to completion of the downloading of the data. In any case, the first process may be initiated during downloading of the data over the network. More information regarding one embodiment whereby the first process is carried out will be set forth in greater detail during reference to FIG. 6.

Figure 5B:
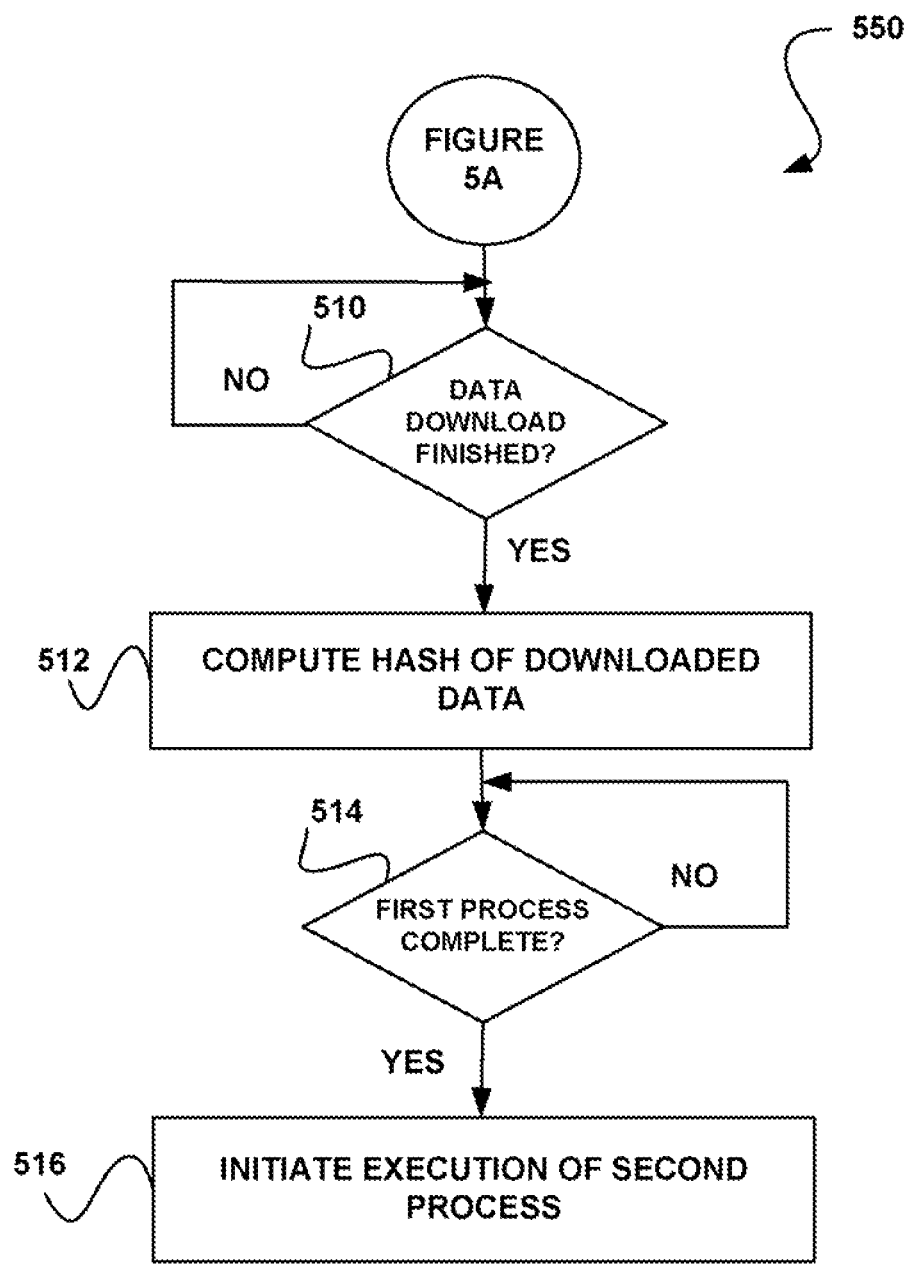
FIG. 5B shows a method for initiating execution of a second process after completion of the first process of FIG. 5A, in accordance with still yet another embodiment.

FIG. 5B shows a method 550 for initiating execution of a second process in response to downloaded data, in accordance with still yet another embodiment. As an option, the method 550 may be carried out in the context of the architecture and environment of FIGS. 1-5A. Of course, however, the method 550 may be carried out in any desired environment. It should also be noted that the aforementioned definitions may apply during the present description.

As shown in decision 510 (which follows operation 508 of FIG. 5A) it is determined whether the data download is finished. For example, in one embodiment, the network gateway scanner may determine whether a final packet associated with the data has been downloaded from the server. Of course, however, such determination may be made in any desired manner.

Additionally, once it is determined in decision 510 that the data download is finished, a hash of the downloaded data is computed. See operation 512. To this end, the network gateway scanner may be capable of computing the hash of the downloaded data. In one embodiment, the hash may be computed utilizing the same hashing function associated with hashes stored on the server from which the data was downloaded.

Further, in operation 514 it is determined whether the first process is complete. In one embodiment, the first process may return a value or perform an action when it completes. Thus, the determination of whether the first process is complete may be based on such returned value, or any other indicator, for that matter.

Further still, once it is determined in decision 514 that the first process is complete, execution of a second process is initiated, as shown in operation 516. In the context of the present embodiment, the second process may include any process capable of initiating a scan of the downloaded data. In one embodiment, the second process may compare the computed hash to a hash of the data received from the server, and may further determine whether to scan such data based on the comparison. In this way, the second process may be performed after the downloading of the data and the completion of the first process. More information regarding one embodiment whereby the second process is carried out will be set forth in greater detail during reference to FIG. 7.

Figure 6:
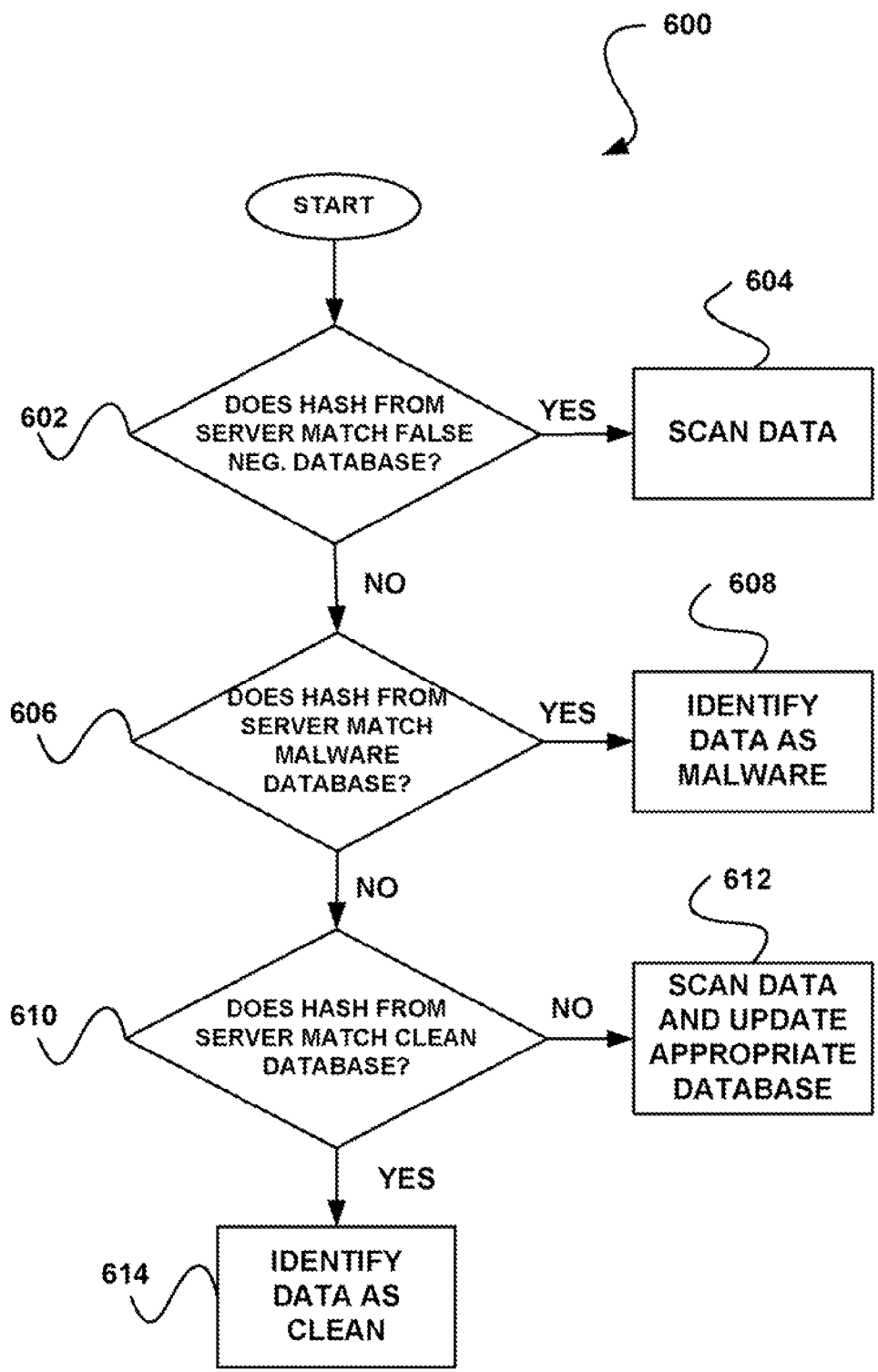
FIG. 6 shows a method for determining whether to scan data during a first process, in accordance with another embodiment.

FIG. 6 shows a method 600 for determining whether to scan data during a first process, in accordance with another embodiment. As an option, the method 600 may be implemented in the context of the architecture and environment of FIGS. 1-5B. For example, the method 600 may be carried out in the context of operation 508 of FIG. 5A. Of course, however, the method 600 may be carried out in any desired environment. It should also be noted that the aforementioned definitions may apply during the present description.

As shown in decision 602, it is determined whether a hash of data from a server matches a hash found in a false negative database. As mentioned earlier, the hash of the data may include a hash of data in the process of being downloaded from the server, for example. In addition, the hash of the data may have been communicated from the server in association with the downloading of the data from the server.

Furthermore, the false negative database may include hashes for different data, where such hashes have previously been determined to be compromised. For example, an instance of clean data and an instance of infected data may have the same hash value.

If it is determined in decision 602 that there is a match, a flag is set indicating that the data is to be scanned. See operation 604. The scanning may include searching for malware, exploited vulnerabilities, and/or any other potentially unwanted aspect of the data. In this way, data known to be associated with the false negative identification of unwanted content may be set to be scanned.

Additionally, if it is determined in decision 602 that there is no match, it is determined whether the hash from the server matches a hash found in a malware database. See decision 606. The malware database may include hashes for different data, where such data has previously been determined to contain malware (e.g. based on a previous scan, etc.). For example, the malware database may include hashes for data infected with a virus, spy ware, adware, etc.

If it is determined in decision 606 that there is a match, a flag is set indicating that the data is to be identified as malware. See operation 608. This identification may include flagging the data as containing malware, for example. In addition, the set flag may further indicate that the data is to be quarantined, prevented from being communicated to a client that requested the data, cleaned, etc.

Furthermore, if it is determined in decision 606 that there is no match, it is determined whether the hash from the server matches a hash found in a clean database. See decision 610. The clean database may include a database of hashes for which associated data has previously been identified as clean (e.g. based on a previous scan, etc.). For example, clean data may include data determined to not include unwanted content.

If it is determined in decision 610 that there is no match, a flag is set indicating that the data is to be scanned and that an appropriate database is to be updated based on the scan. See operation 612. In one embodiment, the appropriate database may include a database associated with the status of the data identified based on the scan. For example, if the data is identified as malware based on the scan, the malware database may be updated with the hash of the data from the server. Similarly, if the data is identified as clean based on the scan, the clean database may be updated with the hash of the data from the server.

If it is determined in decision 610 that there is a match, a flag is set indicating that the data is to be identified as clean. See operation 614. In one embodiment, the data may be identified as clean by flagging the data as clean. As an option, the set flag may also indicate that an action is to be performed on the data. For example, such action may include forwarding the data to a client that requested the data.

The false negative database may optionally be updated periodically with new hashes. Such updates may be performed in any desired manner, such as, for example, manually (e.g. via an administrator) or automatically (e.g. utilizing updating software in conjunction with a central data server, etc.).

Table 1 illustrates one example of code utilized in a first process for determining whether to scan data. It should be noted, however, that such code is set forth for exemplary purposes only, and thus should not be construed as limiting in any manner

TABLE 1

```
a) Check if hash (file) is present in fData
b) If hash value is present in fData then
    // File needs to be sent for scan and there should be no update
    // to any database (gData or bData)
        Set Action=SCAN;
        Set updateDatabase=FALSE
        Return;
    Else
        Proceed with the below steps.
    Endif
c) Check if hash (file) is present in bData
d) If hash value is not present in bData then
    Check if hash (file) is present in gData
        If hash value is not present in gData then
            // File needs to be scanned and the appropriate database
            // needs to be updated (either gData or bData)
                Set Action=SCAN;
                Set updateDatabase=TRUE
                Return;
        Else
            // declare file is clean
                Set Action=NONE
                Set updateDatabase=FALSE
                Return;
        Endif
    Else
        // set the appropriate action for bad files.
            Set Action=INFECTED_FILE_ACTION
            Return;
    Endif
```

As shown in Table 1, fData represents a false negative database, gData represents a clean database, and bData represents a malware database. In addition, it is determined whether the hash from the server is located in fData. If it is, a flag is set indicating that the data associated with the hash is to be scanned. If, however, it is determined that the hash is not located in fData, it is determined whether the hash from the server is located in bData. If it is, a flag is set indicating that a predetermined infected file action is to be performed on the file.

If, however, it is determined that the hash is not located in bData, it is determined whether the hash from the sever is located in gData. If the hash is not located in gData, a flag is set indicating that the file is to be scanned and that a database associated with results of the scan is to be updated with the hash of the file. For example, bData may be updated if the scanned file is determined to contain malware, whereas gData may be updated if the scanned file is determined to be clean.

Further still, if it is determined that the hash from the server is located in gData, a flag is set indicating that the file is to be identified as clean. Optionally, in response to an identification that the file is clean, the file may be communicated (e.g. downloaded) to a client that requested the file.

Figure 7:
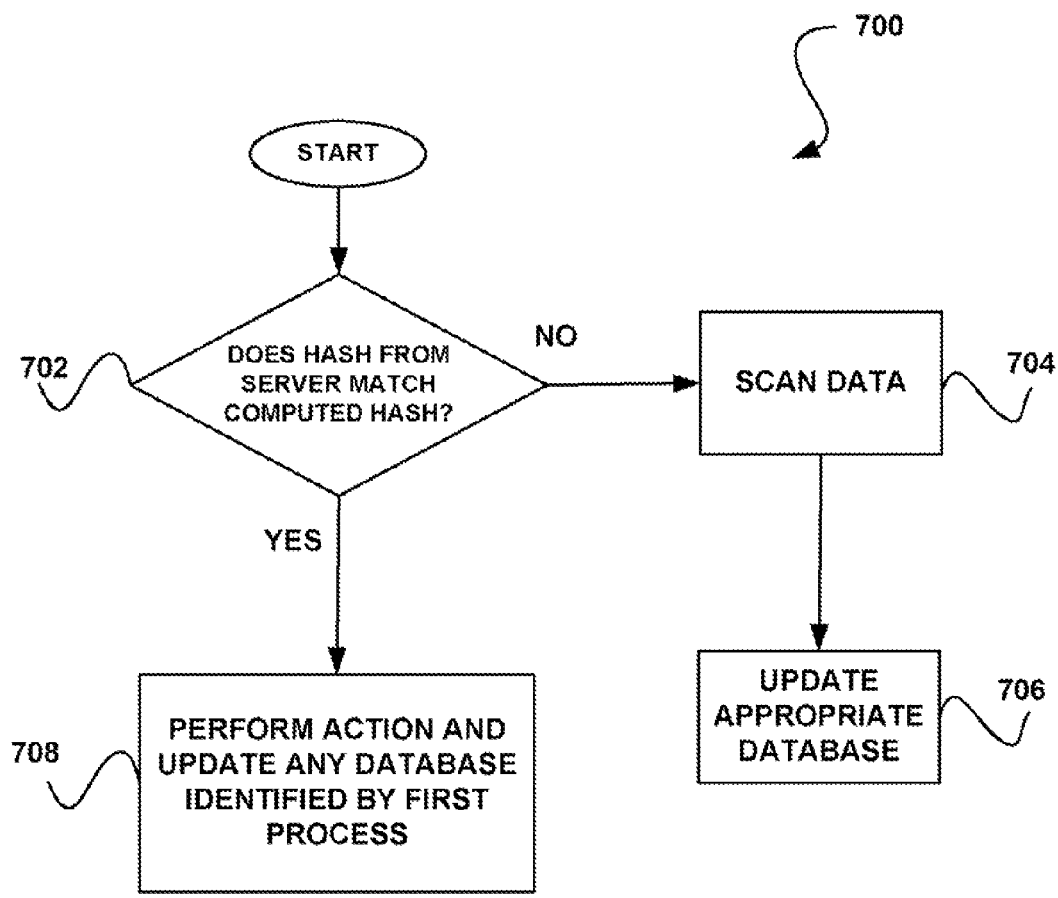
FIG. 7 shows a method for determining whether to scan data during a second process, in accordance with yet another embodiment.

FIG. 7 shows a method 700 for determining whether to scan data during a second process, in accordance with yet another embodiment. As an option, the method 700 may be carried out in the context of the architecture and environment of FIGS. 1-6. For example, the method 700 may be carried out in the context of operation 516 of FIG. 5B. Of course, however, the method 700 may be carried out in any desired environment. It should also be noted that the aforementioned definitions may apply during the present description.

As shown in decision 702, it is determined whether a hash from a server associated with data matches a computed hash of such data. In the context of the present embodiment, the computed hash may include a hash computed for data that has been downloaded. It should be noted that the comparison may be performed in any desired manner. In one example, the network gateway scanner may directly compare the entire hash received from the server to the entire hash calculated by the network gateway scanner.

If it is determined in decision 702 that the hash from the server does not match the computed hash, the data is scanned. See operation 704. For example, the data may be scanned for unwanted content. In this way, data may be scanned if an inaccurate hash of such data is communicated form the server.

In addition, after the data is scanned in operation 704, an appropriate database is updated, as shown in operation 706. For example, new data may be added to the database, existing data may be altered or deleted from the database, or the database may be altered in any other manner. In one embodiment, if the data is determined to include malware based on the scan, a malware database may be updated with the computed hash. In another embodiment, if the data is determined to be clean based on the scan, a clean database may be updated with the computed hash.

If it is determined in decision 702 that the hash from the server matches the computed hash, an action associated with flagged data from a first process (e.g. see FIG. 6) is performed and any database identified by the first process is updated. See operation 708. Thus, an action may be performed based on the comparison. For example, if the action identified by the first process indicates a scan of the data, the data is scanned and afterwards an appropriate database may optionally be updated based on the results of the scan. Just by way of example, if data is flagged to be scanned during the first process, the data may be scanned during the second process based on such flag.

Table 2 illustrates one example of code for carrying out a second process during which it is determined whether to scan data. It should be noted, however, that such code is set forth for exemplary purposes only, and thus should not be construed as limiting in any manner.

TABLE 2 a) If [computed hash value doesn't match the one obtained from server]
   then
      Send the file for scanning
      Update the appropriate database (gData, or bData)
   Else
      TakeAction (Action, updateDatabase)
   Endif As shown, it is determined whether the hash of the data from the server matches the computed hash of such data. If the server hash does not match the computed hash, the file is scanned. If the scanned file is determined to be clean based on the scan, the computed hash thereof is added to gData (i.e. the clean database). If the scanned file is determined to include malware, the computed hash thereof is added to bData (i.e. the malware database).

For example, during the first process a malicious file may be sent from a server to a network gateway scanner in addition to a hash thereof that matches hashes in a clean database. As a result, the file may be noted as clean, such that no action may be set to be taken during the first process. However, during the second process, a computed hash of the malicious file is compared to the hash sent by the server. When it is determined that the two hashes do not match, the malicious file is sent for scanning and its hash is added to bData based on the scan.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. At least one non-transitory computer readable medium having instructions stored thereon, the instructions when executed on a machine cause the machine to:
   receive data associated with a communication of the data over a network;
   receive a hash of the data;
   during the communication of the data over the network:
      determine whether the hash of the data matches a hash within a false negative database;
      determine whether the hash of the data matches a hash within an unwanted content database when it is determined that the hash of the data does not match a hash within the false negative database; and
      determine whether the hash of the data matches a hash within a clean database when it is determined that the hash of the data does not match a hash within the unwanted content database;
   when it is determined that the hash of the data does not match a hash of data within the clean database:
      compute a hash of the data after the data is communicated;
      compare the computed hash with the received hash;
      scan the data for unwanted content if the received hash does not match the computed hash;
      update the unwanted content database with the computed hash if the data is determined to include unwanted content by the scanning; and
      update the clean database with the computed hash if the data is not determined to include unwanted content by the scanning.

2. The non-transitory computer readable medium of claim 1, wherein communicating the data over the network includes downloading the data over the network.

3. The non-transitory computer readable medium of claim 1, wherein the data includes a file being downloaded using a protocol.

4. The non-transitory computer readable medium of claim 1, wherein the scanning is performed by a network gateway scanner.

5. The non-transitory computer readable medium of claim 1, wherein the hash of the data is received from a server in response to a request communicated to the server.

6. The non-transitory computer readable medium of claim 5, wherein the server stores a database of hashes for a plurality of different data.

7. The non-transitory computer readable medium of claim 1, further comprising comparing the received hash to at least one database.

8. The non-transitory computer readable medium of claim 7, wherein the at least one database includes at least one of a false negative database, a malware database, and a clean database.

9. The non-transitory computer readable medium of claim 7, wherein the data is scanned based on the comparison.

10. The non-transitory computer readable medium of claim 7, wherein an action is performed based on the comparison.

11. The non-transitory computer readable medium of claim 7, further comprising updating a database with the hash of the data.

12. The non-transitory computer readable medium of claim 11, wherein the database is updated with the data after the data is scanned.

13. The non-transitory computer readable medium of claim 1, wherein the received hash is included within a header of the data.

14. The non-transitory computer readable medium of claim 13, wherein the communication is associated with an e-mail message that includes an attachment.

15. The non-transitory computer readable medium of claim 14, wherein the header is a header associated with the attachment.

16. The non-transitory computer readable medium of claim 14, wherein computing a hash includes computing a hash associated with contents included in the attachment.

17. A method, comprising:
   receiving data associated with a communication of the data over a network;
   receiving a hash of the data;
   during the communication of the data over the network:
      determining whether the hash of the data matches a hash within a false negative database;
      determining whether the hash of the data matches a hash within an unwanted content database when it is determined that the hash of the data does not match a hash within the false negative database; and
      determining whether the hash of the data matches a hash within a clean database when it is determined that the hash of the data does not match a hash within the unwanted content database;
   when it is determined that the hash of the data does not match a hash of data within the clean database:
      computing a hash of the data after the data is communicated;
      comparing the computed hash with the received hash;
      scanning the data for unwanted content if the received hash does not match the computed hash;
      updating the unwanted content database with the computed hash if the data is determined to include unwanted content by the scanning; and
      updating the clean database with the computed hash if the data is not determined to include unwanted content by the scanning.

18. A system, comprising:
   a processor, wherein the system is configured for:
      receiving data associated with a communication of the data over a network;
      receiving a hash of the data;
      during the communication of the data over the network:
         determining whether the hash of the data matches a hash within a false negative database;
         determining whether the hash of the data matches a hash within an unwanted content database when it is determined that the hash of the data does not match a hash within the false negative database; and
         determining whether the hash of the data matches a hash within a clean database when it is determined that the hash of the data does not match a hash within the unwanted content database;
      when it is determined that the hash of the data does not match a hash of data within the clean database:
         computing a hash of the data after the data is communicated;
         comparing the computed hash with the received hash;
         scanning the data for unwanted content if the received hash does not match the computed hash;
         updating the unwanted content database with the computed hash if the data is determined to include unwanted content by the scanning; and
         updating the clean database with the computed hash if the data is not determined to include unwanted content by the scanning.

19. The system of claim 18, further comprising memory coupled to the processor via a bus.

* * * * *